(12) United States Patent
Lee et al.

(10) Patent No.: US 10,876,061 B2
(45) Date of Patent: Dec. 29, 2020

(54) SYSTEMS AND METHODS FOR CANNABIS WASTE DISPOSAL

(71) Applicant: Gaiaca, LLC, Del Rey Oaks, CA (US)

(72) Inventors: Jonathan Lee, Monterey, CA (US); Garrett Rodewald, Pacific Grove, CA (US)

(73) Assignee: Gaiaca, LLC, Gonzales, CA (US)

( * ) Notice: Subject to any disclaimer, the term of this patent is extended or adjusted under 35 U.S.C. 154(b) by 126 days.

(21) Appl. No.: 16/198,747

(22) Filed: Nov. 21, 2018

(65) Prior Publication Data
US 2019/0153345 A1 May 23, 2019

Related U.S. Application Data

(60) Provisional application No. 62/590,204, filed on Nov. 22, 2017.

(51) Int. Cl.
*C10L 5/44* (2006.01)
*C10L 5/08* (2006.01)

(52) U.S. Cl.
CPC . *C10L 5/44* (2013.01); *C10L 5/08* (2013.01); *C10L 2200/0469* (2013.01); *C10L 2290/06* (2013.01); *C10L 2290/148* (2013.01); *C10L 2290/28* (2013.01); *C10L 2290/30* (2013.01)

(58) Field of Classification Search
CPC ............. C10L 1/324; C10L 2200/0295; C10L 2200/0484; C10L 2250/06; C10L 2200/0446; C10L 2200/025
See application file for complete search history.

(56) References Cited

U.S. PATENT DOCUMENTS

| | | | |
|---|---|---|---|
| 2013/0263597 A1* | 10/2013 | Chauvin | F01K 3/181 60/644.1 |
| 2019/0246591 A1* | 8/2019 | Leo | A01G 22/15 |
| 2020/0102518 A1* | 4/2020 | Calabrese | C10L 5/403 |

OTHER PUBLICATIONS

Wikipedia "Municipal solid waste" (2006) (Year: 2006).*

* cited by examiner

*Primary Examiner* — Cephia D Toomer
*Assistant Examiner* — Chantel L Graham
(74) *Attorney, Agent, or Firm* — Eversheds Sutherland (US) LLP; Christopher C. Bolten; Albert K. Heng

(57) ABSTRACT

Systems and methods for rendering cannabis-related waste materials are provided. The method includes obtaining a plurality of cannabis-related waste materials, preparing a blend comprising a predetermined amount of each of the plurality of cannabis-related waste materials, pulverizing the blend such that the blend is unrecognizable and unusable, heating the blend to at least 150 degrees Fahrenheit for an amount of time sufficient to sterilize and denature the blend, removing evaporated liquid from the heated blend, and cooling the heated blend to form a refuse-derived fuel material.

30 Claims, 2 Drawing Sheets

SYSTEMS AND METHODS FOR CANNABIS WASTE DISPOSAL

CROSS-REFERENCE TO RELATED APPLICATIONS

This application claims the benefit of priority of U.S. Provisional Application Ser. No. 62/590,204, filed Nov. 22, 2017, the entire contents of which are incorporated herein by reference.

FIELD OF USE

The present disclosure is directed to systems and methods for cannabis waste disposal.

BACKGROUND

The cannabis industry, e.g., medical and recreational, encompasses a variety of business such as grow operations, product manufacturers, distributors, dispensaries, and testing laboratories. As the cannabis industry continues to grow, the steps of harvesting and processing cannabis, e.g., marijuana, for extraction, and infusion of products (which include, but are not limited to: edibles, e.g., cookie, brownie, candy, chocolate, gummy, beverage, soda, dessert, caramel, mint, pill, hot sauce, dried fruit, olive oil, and cooking oil; cannabis extract/concentrate; tincture/sublingual strips; topical, e.g., balm, salve, lotion, oil, and bath bomb; joints/blunts/cigarettes; vaporizers, and cannabis applicators) generate large amounts of by-products and waste. Cannabis is a Schedule 1 Controlled Substance, and therefore must adhere to the Federal Controlled Substances Act.

Accordingly, cannabis-related waste materials including cannabis waste (i.e. cannabis plant material), cannabis-infused products, mixed packaging, manufacturing byproducts, grow medium, contaminated disposables, and contaminated cannabis waste must be disposed of in compliance with applicable state laws and regulations. Specifically, cannabis waste may still contain regulated substances, e.g., tetrahydrocannabinol (THC), the chemical responsible for the medical effects of cannabis, and thus must be disposed of in compliance with applicable state laws and regulations. Cannabis waste includes cannabis plant material/biomass such as roots, stalks, stems, leaves, and flowers of the cannabis plant. Cannabis-related wastes materials includes cannabis-infused products with mixed packaging, e.g., glass, plastic, fiber, and metal, manufacturing byproducts, e.g., plant fats, waxes, lipids, and terpenes, non-compostable grow mediums such as rock-wool, contaminated disposables, e.g., personal protective equipment such as nitrile/rubber gloves, batteries, cellulose papers, filters, containers, utensils, and lab ware, and contaminated cannabis waste, e.g., cannabis plant material/biomass, e.g., roots, stalks, stems, leaves, and flowers of the cannabis plant, having high levels of contaminants, e.g., pesticides, fertilizers, solvents (alcohols-based, hydrocarbon-based), chemicals, reactants, and heavy metals.

Currently, 33 states have legalized medical cannabis. Although the Federal Controlled Substances Act controls the substance, individual states are responsible for handling the cultivation, manufacturing, storage, and disposal of cannabis waste. For example, California state law requires that medical and recreational cannabis waste must be made unusable and unrecognizable prior to leaving the licensed premises. Similarly, Illinois state law requires dispensaries to destroy cannabis waste in order to render it unusable, stating an "allowable method to render cannabis waste unusable is by grinding and incorporating the cannabis waste with other ground materials so the resulting mixture is at least 50% non-cannabis waste by volume," and Washington state law recites "[t]he allowable method to render marijuana plant waste unusable is by grinding and incorporating the marijuana plant waste with other ground materials so the resulting mixture is at least fifty percent non-marijuana waste by volume." As the cannabis industry highly impacts our environment, these cannabis disposal laws are essential for the protection of public health and the environment.

Typically, cannabis waste is mixed with either compostable waste or non-compostable waste to render it unusable and unrecognizable in accordance with state laws and regulations. Suggested compostable waste currently used includes food waste, green waste, green waste, and vegetable based grease and oils, and suggested non-compostable waste currently used includes paper waste, cardboard waste, plastic waste, and soil. However, these compostable and non-compostable wastes may be costly, and may not effectively mix with the grinded cannabis waste such that the result is deemed unusable and unrecognizable.

In addition, cannabis-related wastes materials must also be disposed of according to state and local laws and regulations, and typically are disposed of in an unsustainable manner.

In view of the foregoing drawbacks of previously known systems and methods, there exists a need for more efficient and cost-effective systems and methods for the disposal of cannabis-related waste material including cannabis plant material.

SUMMARY

The present disclosure overcomes the drawbacks of previously-known systems and methods by providing efficient and cost-effective systems and methods for rendering cannabis-related waste materials including cannabis plant material for disposal in accordance with state laws and regulations.

A method for rendering cannabis waste may include obtaining cannabis waste material, e.g., stalks, stems, sticks, branches, flowers, buds, leaves, trimmings, or rootballs; grinding down the cannabis waste material to a uniform, homogenous consistency; obtaining non-cannabis material, wherein at least a portion of the non-cannabis material includes wood material, e.g., wood shavings, wood chips, saw dust, bark, branches, limbs, trunks, stumps, heartwood, or sapwood; grinding down the non-cannabis material; and thoroughly blending, e.g., via a commercial soil grinder or mixer, the grinded cannabis waste material and the grinded non-cannabis material, e.g., for a time period of at least approximately two minutes, to produce an unusable and unrecognizable pre-compost blend. For example, the grinded cannabis waste material may be thoroughly blended with at least equal parts of the grinded non-cannabis material.

The cannabis waste material may have a high Nitrogen content, and the wood shavings may have a high Carbon content, thereby improving the quality of the resulting pre-compost blend. At least another portion of the non-cannabis material may include at least one of coffee grounds, tea leaves, yard debris, or other natural materials. In one embodiment, grinding down the cannabis waste material and grinding down the non-cannabis material are performed simultaneously. The particles of the grinded cannabis waste material and the particles of the grinded non-cannabis material may have sizes ranging from dust to a grain of rice to the size of bark.

The method may also include wetting the grinded cannabis waste material and the grinded non-cannabis material with an amount of liquid sufficient to reduce or prevent dust release prior to thoroughly blending the grinded cannabis waste material and the grinded non-cannabis material. For example, the grinded cannabis waste material and the grinded non-cannabis material may be wetted with approximately 1 to 5 gallons of liquid per approximately 55 gallons of the grinded cannabis waste material and/or the grinded non-cannabis material. The thoroughly blended pre-compost blend may also be wetted with an amount of liquid sufficient to reduce or prevent dust release. The method may also include rendering the pre-compost blend into compost via a Bokashi method, or in-vessel digestion.

In accordance with another aspect of the present invention, a system cannabis waste disposal is provided. The system may include at least one grinder for grinding at least one of cannabis waste material or non-cannabis material, and a mixer configured to thoroughly blend grinded cannabis waste material and grinded non-cannabis material to produce an unusable and unrecognizable pre-compost blend. The at least one grinder may include a first grinder for grinding cannabis waste material and a second grinder for grinding non-cannabis material. Specifically, at least a portion of the non-cannabis material includes wood material, e.g., wood shavings, wood chips, saw dust, bark, branches, limbs, trunks, stumps, heartwood, or sapwood. In one embodiment, the same grinder may be used to grind both the cannabis waste material and the non-cannabis material simultaneously. The system may also include a composting system for rendering the pre-compost blend into compost via a Bokashi method or in-vessel digestion.

In accordance with yet another aspect of the present invention, a method for rendering cannabis-related waste is provided. The method includes obtaining a plurality of cannabis-related waste materials, e.g., cannabis plant material, cannabis-infused products, mixed packaging, manufacturing byproducts, grow medium, contaminated disposables, or cannabis plant material having a high level of contaminants rendering it unsuitable for compost. The method further includes preparing a blend comprising a predetermined amount of each of the plurality of cannabis-related waste materials obtained. The prepared blend may be selected to control at least one of moisture content, liquid state, or organic or inorganic content. For example, the blend may include 20% cannabis plant material, 20% cannabis-infused products, 20% mixed packaging, 20% grow medium, 20% contaminated disposables. Prior to preparing the blend, the plurality of cannabis-related waste materials may be organized based on preselected attributes of each of the plurality of cannabis-related waste materials obtained.

The method may include loading the blend into a thermokinetic waste converter designed to pulverize and heat the blend. Accordingly, the method includes pulverizing the blend such that the blend is unrecognizable and unusable, e.g., to a size of a grain of rice, and heating the blend to at least 150 degrees Fahrenheit, e.g., at least 200 or 300 degrees Fahrenheit, for an amount of time sufficient to sterilize, e.g., remove any pathogens and biohazards from, and denature, break down cannabinoids in, the blend. Specifically, the high-speed rotor of the thermokinetic waste converter is designed to convert kinetic energy to thermal energy to heat the blend via friction. To achieve higher temperatures such as 300 degrees Fahrenheit, the method may further include introducing hot steam while heating the blend via friction. In accordance with one aspect of the present invention, the blend is pulverized and heated for no more than 30 minutes.

The method further includes removing evaporated liquid from the heated blend. Accordingly, the evaporated liquid removed from the blend may be collected in a separate holding container. The method further includes cooling the heated blend to form a refuse-derived fuel material that is reduced in volume by up to 80%, and in weight by up to 50%, while retaining its full calorific value. The refuse-derived fuel material may be used in at least one of traditional power plants, cement kilns, gasification modules, or pyrolysis plants. In addition, the refuse-derived fuel material may be discharged into a holding cell, where it may be pelletized, compressed, or vacuum-packed-and-sealed, to be used as a renewable energy source.

DETAILED DESCRIPTION

Cannabis-related waste materials including cannabis waste (i.e. cannabis plant material), cannabis-infused products, mixed packaging, manufacturing byproducts, grow medium, contaminated disposables, and contaminated cannabis waste, must be disposed of in compliance with the governing state laws and regulations, e.g., by rendering it unusable and unrecognizable. By blending grinded cannabis plant material with at least equal parts of grinded non-cannabis material, wherein at least a portion of the non-cannabis material includes wood shavings, the resulting pre-compost blend is unusable and unrecognizable. In accordance with the principles of the present disclosure, the pre-compost blend resulting from the methods described herein may be revitalized into rich compost, e.g., via the Bokashi method or in-vessel digestion.

In addition, cannabis-related waste materials may be transformed into refuse-derived fuel by pulverizing, heating, sterilizing, denaturing, and cooling the cannabis-related waste materials. In accordance with the principles of the present disclosure, the refuse-derived fuel may be pelletized, compressed, or vacuum-packed-and-sealed, to be used as a renewable energy source.

Figure 1:
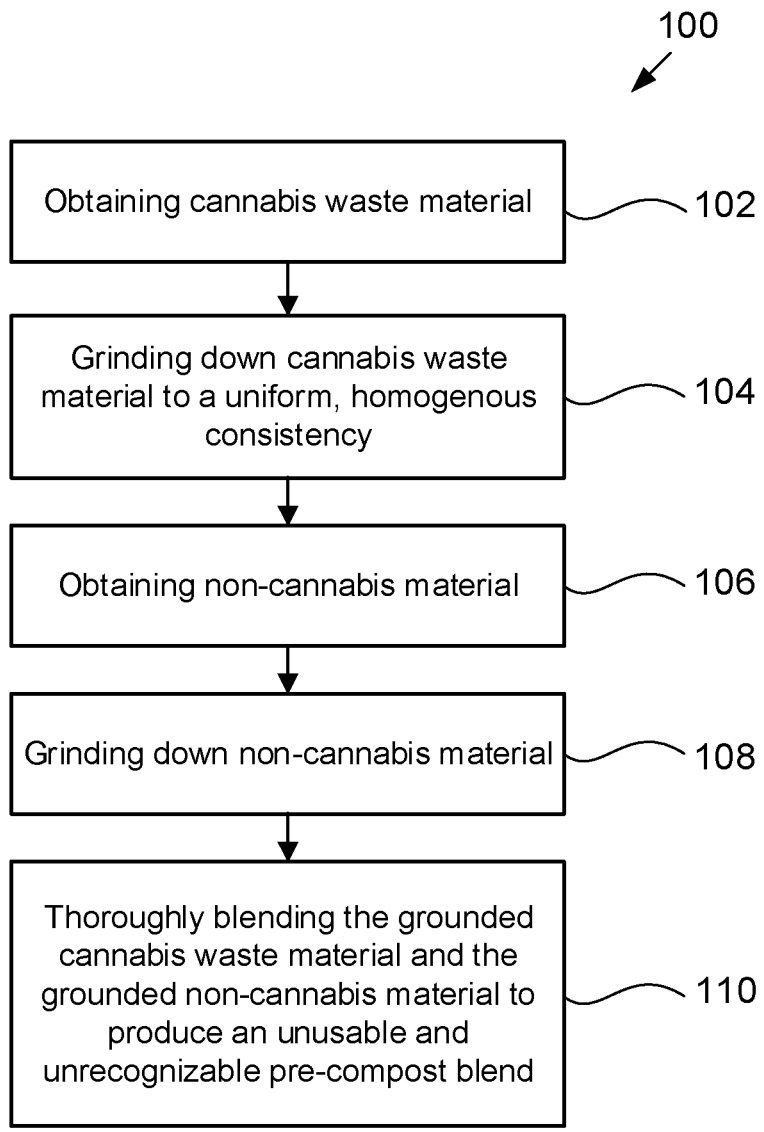
FIG. 1 illustrates various steps of an exemplary method for rendering cannabis waste in accordance with the principles of the present disclosure.

Referring to FIG. 1, exemplary method 100 for rendering cannabis waste is described. At step 102, cannabis waste is obtained. Cannabis waste may include cannabis plant material such as roots, stalks, flower, leaves, and stems of the cannabis plant. Cannabis is considered a "wet green" material, high in Nitrogen.

At step 104, the cannabis waste material is grinded down, e.g., via a commercial wood chipper or shredder if the cannabis waste material includes hard/rigid cannabis plant material, or a commercial grinder if the cannabis waste material includes soft/malleable cannabis plant material, to a uniform, homogenous consistency. Hard/rigid cannabis plant materials include stalks, stems, sticks, branches, etc., and soft/malleable cannabis plant materials include flowers, buds, leaves, trimmings, etc. The particles of the grinded cannabis waste material may have sizes ranging from dust to a grain of rice.

In addition, the grinded cannabis waste material may be wetted with approximately 1 to 5 gallons of liquid, e.g., water, per approximately 55 gallons of the grinded cannabis waste material, e.g., 1.8%-9.1% water/material ratio, to reduce or prevent dust release. The resulting grinded cannabis waste material/liquid mixture is merely damp, e.g., not a sludge or slurry, and is able to retain its water composition in a solid form. The liquid in the mixture also reduces dust/release of airborne contaminants, provides odor control, as well as aids in the mixing process.

At step 106, non-cannabis material, e.g., an organic compostable material, is obtained. At least a portion of the non-cannabis material includes wood material, e.g., wood shavings. Different types of wood shavings include wood chips, saw dust, bark, branches, limbs, trunks, stumps, heartwood, sapwood, etc. Wood shavings are a natural, organic material this is easily wetted and retains moisture well. Wood shavings are already broken down, making them easier to grind down further and to mix with the cannabis waste material. In addition, wood shavings provide dark pigments which is similar to that of aged cannabis waste materials, which makes the cannabis waste material even more unrecognizable upon blending. Wood shavings are also light-weight, inexpensive, and readily available. Wood shavings are considered a "dry brown" material, high in Carbon. In addition to, or alternatively, the non-cannabis material may include at least one of corn starch, vegetable starch, polymeric carbohydrate, natural adhesives, dextrin, natural resins, casein (i.e., milk protein), hide-based animal glues, bioadhesives, flour and water (heated), albumen (blood protein), natural wood lignin, organic polymers, or gelatin.

At least another portion of the non-cannabis material may include at least one of yard debris, food waste, coffee grounds, tea leaves, leaves, flowers, seeds, grass, animal feces/manure, soil, vegetables, fruits, pericarp (meat around the seed of a fruit), caryopsis (cereal grain fruit, e.g., wheat, barley, rice), marine mollusk shells, marine algae, hair, insect parts, natural and synthetic fibers, etc.

At step 108, the non-cannabis material is grinded down, e.g., via a wood chipper/shredder. The particles of the grinded non-cannabis material may have sizes ranging from dust to a grain of rice. In one embodiment, the same grinder/shredder used to grind down the cannabis waste material may be used to grind down non-cannabis material. In addition, the cannabis waste material and non-cannabis material may be grinded down simultaneously, e.g., using the same grinder/shredder at the same time. For example, the cannabis waste material and non-cannabis material may be grinded down using an industrial multi-purpose grinder provided by JWC Environmental®. In this embodiment, step 104 and step 108 may be performed simultaneously such that the cannabis waste material and non-cannabis material are grinded down and blended simultaneously.

In addition, the grinded non-cannabis material may be wetted with approximately 1 to 5 gallons of liquid, e.g., water, per approximately 55 gallons of the grinded non-cannabis material, e.g., 1.8%-9.1% water/material ratio, to reduce or prevent dust release. The resulting grinded non-cannabis material/liquid mixture is merely damp, e.g., not a sludge or slurry, and is able to retain its water composition in a solid form.

At step 110, the grinded cannabis waste material and the grinded non-cannabis material are thoroughly blended, e.g., via a commercial soil mixer, such that the blended cannabis waste material and the grinded non-cannabis material completely mixed as will be understood by a person of ordinary skill in the art. For example, the grinded cannabis waste material may be thoroughly blended with at least equal parts of the grinded non-cannabis material in compliance with various state laws and regulations. The grinded cannabis waste material and the grinded non-cannabis material may be thoroughly blended for a time period of at least approximately two minutes, or until thoroughly blended to produce an unusable and unrecognizable pre-compost blend. As will be understood by a person having ordinary skill in the art, if step 104 and step 108 are performed simultaneously such that the cannabis waste material and non-cannabis material are grinded down and blended simultaneously, there is no need to perform step 110 as the grinded cannabis waste material and the grinded non-cannabis material will already be thoroughly blended.

The pre-compost blend is "unrecognizable" in that the cannabis plant material is rendered indistinguishable from any other plant material as will be understood by a person of ordinary skill in the art. The pre-compost blend is "unusable" in that the cannabis waste material generated from cultivation, manufacturing, retail, testing lab, or distribution has no further use or value in that particular process, such that is not attractive or desirable for use for, e.g., smoking, eating, manufacturing, packaging, etc. Additionally, unusable cannabis waste material that has been altered in its physical and/or chemical state, has reduced or no medical and/or psychoactive properties compared to those of unaltered cannabis product.

In addition, the pre-compost blend may be wetted with approximately 1 to 5 gallons of liquid, e.g., water, per approximately 55 gallons of the pre-compost blend, e.g., 1.8%-9.1% water/material ratio, to reduce or prevent dust release. The resulting pre-compost blend/liquid mixture is merely damp, e.g., not a sludge or slurry, and is able to retain its water composition in a solid form. The pre-compost blend will also begin to break down more quickly if damp.

In addition, the pre-compost blend may be further rendered into compost via, e.g., the Bokashi method or in-vessel digestion as will be understood by a person having ordinary skill in the art. The high Carbon content of the wood material and the high Nitrogen content of the cannabis waste material results in a high quality pre-compost blend for creating compost. Therefore, the pre-blend compost may be revitalized into compost, e.g., ready-to-use-soil.

As will be understood by a person having ordinary skill in the art, other suitable mixers and grinders include cement mixers, soil mixers, soil batch mixers, conical mixers, paddle mixers, mortar mixers, drum and barrel mixers, grain mixers, compost screeners, rototillers, commercial food/culinary mixers, rotor bar mixers, dispersion mixers, soil grinders, feed grinders, grain grinders, commercial food/culinary grinders, meat grinders, and wood grinder, etc.

Figure 2:
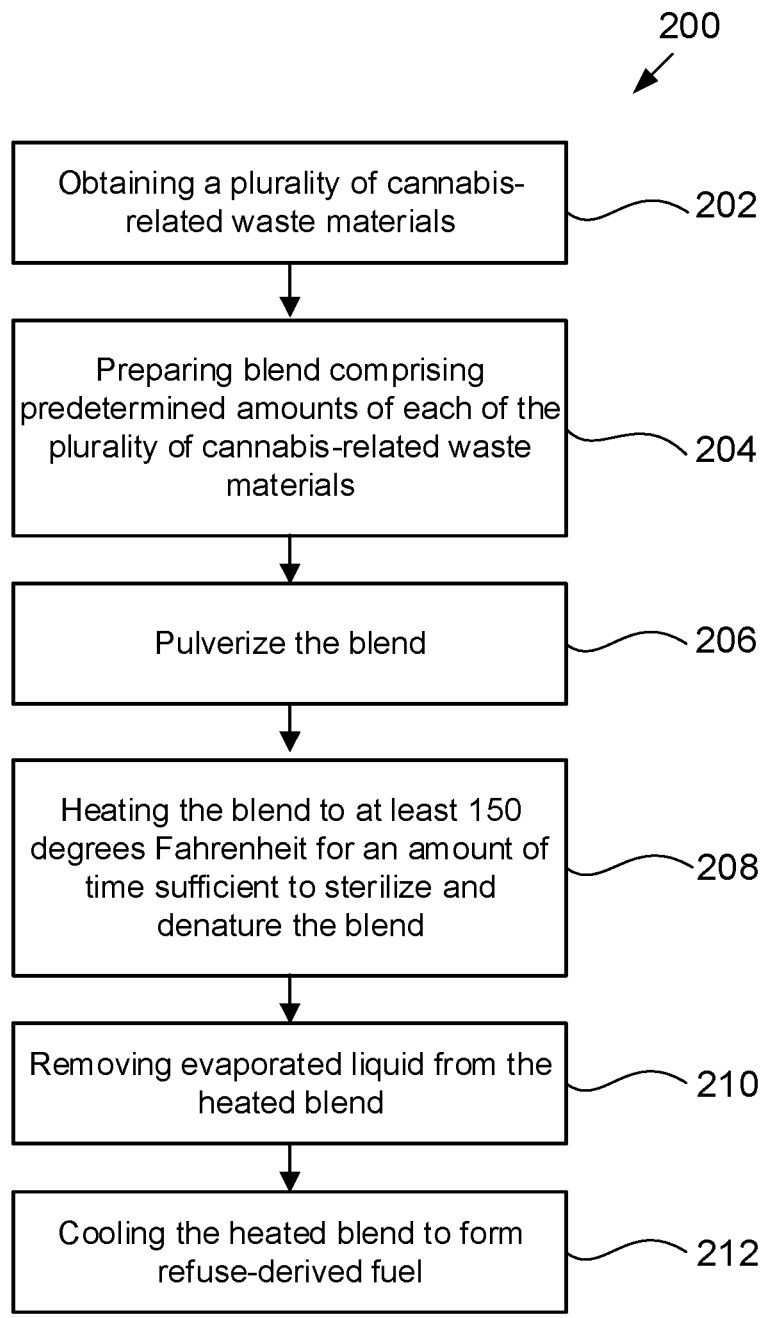
FIG. 2. illustrates various steps of an exemplary method for rendering cannabis-related waste in accordance with the principles of the present disclosure.

Unlike cannabis plant material, not all cannabis-related waste materials are compostable. Thus, referring now to FIG. 2, exemplary method 200 for rendering cannabis-related waste materials is described. At step 202, a plurality of cannabis-related waste materials is obtained, e.g., collected from cannabis operators such as testing labs, distributors, dispensaries, microbusinesses, cannabis cultivators, nurseries, processors, and manufacturers of cannabis products. Cannabis-related waste materials may include cannabis waste (i.e. cannabis plant material), cannabis-infused products, mixed packaging, manufacturing byproducts, grow medium, contaminated disposables, and contaminated cannabis waste. For example, cannabis-infused products include: edibles, e.g., cookie, brownie, candy, chocolate, gummy, beverage, soda, dessert, caramel, mint, pill, hot sauce, dried fruit, olive oil, and cooking oil; cannabis extract/concentrate; tincture/sublingual strips; topical, e.g., balm, salve, lotion, oil, and bath bomb; joints/blunts/cigarettes; vaporizers, and cannabis applicators. Mixed packaging includes glass, plastic, fiber, and metal. Manufacturing byproducts include plant fats, waxes, lipids, and terpenes. Non-compostable grow mediums include rock-wool. Contaminated disposables (i.e., disposable items contaminated with cannabis constituents such as cannabinoids) include personal protective equipment such as nitrile/rubber gloves, cellulose papers, filters, containers, utensils, and lab ware. Contaminated cannabis waste includes cannabis plant material/biomass, e.g., roots, stalks, stems, leaves, and flowers of the cannabis plant, having high levels of contaminants, e.g., pesticides, fertilizers, solvents (alcohols-based, hydrocarbon-based), chemicals, reactants, and heavy metals, making the cannabis waste unsuitable for compost. The cannabis-infused products may be removed from its packaging prior to processing.

At step 204, a blend of the plurality of cannabis-related waste materials is prepared using a predetermined amount of each of the cannabis-related waste materials obtained. For example, the blend may include, 20% cannabis plant material, 20% cannabis-infused products, 20% mixed packaging, 20% grow medium, 20% contaminated disposables. As will be understood by a person having ordinary skill in the art, the amount of each of the plurality of cannabis-related waste materials obtained may be selected to control moisture content, liquid state (solid or liquid), or organic or inorganic content, to create a more balanced, efficient mixture for processing. Prior to preparing the blend, the plurality of cannabis-related waste materials obtained may be organized based on preselected attributes of each of the plurality of cannabis-related waste materials, e.g., cannabis plant material, cannabis-infused products, mixed packaging, manufacturing byproducts, grow medium, contaminated disposables, and contaminated cannabis waste.

At step 206, the blend is pulverized such that the blend is unrecognizable and unusable. For example, the blend may be loaded into a sealed chamber of a thermokinetic waste converter having a high-speed rotor designed to pulverize the blend. The blend may be loaded into the thermokinetic waste converter either manually or automatically depending on the size of the converter. Upon operation of the thermokinetic waste converter, the high-speed rotor and steel teeth within the thermokinetic waste converter pulverizes the blend, e.g., to the size of a grain of rice.

At step 208, the pulverized blend is heated to at least 150 degrees Fahrenheit, e.g., at least 200 or 300 degrees Fahrenheit. Specifically, the high-speed rotor of the thermokinetic waste converter is designed to convert kinetic energy to thermal energy to heat the blend via friction. Water in the form of hot steam may be introduced into the sealed chamber of the thermokinetic waste converter to achieve higher temperatures, e.g., at least 300 degrees Fahrenheit. The blend is held within the sealed chamber of the thermokinetic waste converter and heated for, e.g., up to 30 minutes, such that the high temperature within the sealed chamber of the thermokinetic waste converter sterilizes and denatures the blend. For example, the high temperature sterilizes the blend such that any pathogens and biohazards are removed from the blend. In addition, the high temperature denatures the blend by breaking down cannabis constituents such as cannabinoids including tetrahydrocannabinol in the blend. Due to the high temperatures within the sealed chamber of the thermokinetic waste converter during heating, liquid evaporated from the heated blend may be collected at step 210. For example, the liquid may be collecting into a separate holding container for later disposal/treatment. As will be understood by a person having ordinary skill in the art, liquid evaporated from the heated blend may be collected during the heating step of 208.

At step 212, the sterilized and denatured blend is cooled to a suitable temperature within the sealed chamber of the thermokinetic waste converter. Steps 206, 208, and 212 may all occur within the sealed chamber of the thermokinetic waste converter, thus avoiding having to transfer the blend during processing. The result of steps 206, 208, 210, and 212 is a refuse-derived fuel material greatly reduced in size, weight, water content, and overall environmental impact. The refuse-derived fuel material is described as a fuzz or fluff, similar to pet bedding, cotton, blown-in insulation, or spill absorbent. The resulting refuse-derived fuel material is reduced in volume by up to 80%, and in weight by up to 50%, yet retains its full calorific value such that it may be used as a renewable energy source. For example, after the refuse-derived fuel material has cooled, it may be discharged into a separate holding cell, where it may then be pelletized, compressed into bricks or bales for easier storage, or vacuum-packed-and-sealed, depending on its future use, thereby further reducing its environmental impact size. The resulting product may replace fossil fuels in traditional power plants that produce electricity, or may be used in cement kilns, gasification modules, or pyrolysis plants. Method 200 achieves recycling mandates and renders the plurality of cannabis-related waste materials into a renewable energy source in a clean and effective manner, beyond that which is required by state regulations.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:
1. A method for rendering cannabis-related waste, the method comprising:
   obtaining a plurality of cannabis-related waste materials;
   preparing a blend from the plurality of cannabis-related waste materials;
   pulverizing the blend such that the blend is unrecognizable and unusable;
   heating the blend to at least 150 degrees Fahrenheit for an amount of time sufficient to sterilize and denature the blend;
   removing evaporated liquid from the heated blend; and
   cooling the heated blend to form a refuse-derived fuel material.
2. The method of claim 1, further comprising, organizing the plurality of cannabis-related waste materials based on at least one of cannabis plant material, cannabis-infused products, mixed packaging, manufacturing byproducts, grow medium, contaminated disposables, or contaminated cannabis waste, prior to preparing the blend.
3. The method of claim 1, wherein the prepared blend is selected to control at least one of moisture content, liquid state, or organic or inorganic content.
4. The method of claim 1, wherein the plurality of cannabis-related waste materials comprises cannabis plant material having a level of contaminants rendering it unsuitable for compost.

5. The method of claim 1, wherein the plurality of cannabis-related waste materials comprises at least one of cannabis plant material, cannabis-infused products, mixed packaging, manufacturing byproducts, grow medium, contaminated disposables.

6. The method of claim 5, wherein the blend comprises 20% cannabis plant material, 20% cannabis-infused products, 20% mixed packaging, 20% grow medium, 20% contaminated disposables.

7. The method of claim 1, further comprising loading the blend into a thermokinetic waste converter, the thermokinetic waste converter configured to pulverize and heat the blend.

8. The method of claim 7, wherein a high-speed rotor of the thermokinetic waste converter is configured to convert kinetic energy to thermal energy to heat the blend via friction.

9. The method of claim 1, wherein the blend is pulverized via a high speed rotor.

10. The method of claim 1, wherein the blend is pulverized to a size of a grain of rice.

11. The method of claim 1, wherein the blend is heated to at least 200 degrees Fahrenheit.

12. The method of claim 1, further comprising introducing hot steam while heating the blend such that the blend is heated to at least 300 degrees Fahrenheit.

13. The method of claim 1, wherein the blend is sterilized such that any pathogens and biohazards are removed from the blend.

14. The method of claim 1, wherein the blend is denaturized such that cannabinoids in the blend are broken down.

15. The method of claim 1, wherein the blend is pulverized and heated for no more than 30 minutes.

16. The method of claim 1, further comprising collecting the evaporated liquid removed from the blend in a separate holding container.

17. The method of claim 1, wherein the refuse-derived fuel material is configured to be used in at least one of traditional power plants, cement kilns, gasification modules, or pyrolysis plants.

18. The method of claim 1, wherein the refuse-derived fuel material is reduced in volume by up to 80%, and in weight by up to 50%, while retaining its full calorific value.

19. The method of claim 1, further comprising discharging the refuse-derived fuel material into a holding cell.

20. The method of claim 19, further comprising at least one of pelletizing, compressing, or vacuum-packing-and-sealing the refuse-derived fuel material.

21. A method for rendering cannabis-related waste, the method comprising:
obtaining a plurality of cannabis-related waste materials;
preparing a blend from the plurality of cannabis-related waste materials; and
pulverizing the blend such that the blend is unrecognizable and unusable.

22. The method of claim 21, further comprising removing liquid from the pulverized blend.

23. The method of claim 21, wherein the plurality of cannabis-related waste materials comprises cannabis plant material having a level of contaminants rendering it unsuitable for compost.

24. The method of claim 21, wherein the plurality of cannabis-related waste materials comprises at least one of cannabis plant material, cannabis-infused products, mixed packaging, manufacturing byproducts, grow medium, contaminated disposables.

25. The method of claim 21, wherein pulverizing the blend comprises pulverizing the blend via a high speed rotor.

26. The method of claim 21, further comprising heating the pulverized blend to at least 150 degrees Fahrenheit for an amount of time sufficient to sterilize and denature the pulverized blend.

27. The method of claim 26, further comprising cooling the heated blend to form a refuse-derived fuel material.

28. The method of claim 27, wherein the refuse-derived fuel material is configured to be used in at least one of traditional power plants, cement kilns, gasification modules, or pyrolysis plants.

29. The method of claim 21, further comprising sterilizing the pulverized blend to remove any pathogens and biohazards from the pulverized blend.

30. The method of claim 21, further comprising denaturing the pulverized blend to break down cannabinoids in the blend.

\* \* \* \* \*